T. E. SOMERVILLE.
BUNDLE CARRIER.
APPLICATION FILED MAR. 10, 1913.
1,081,559.
Patented Dec. 16, 1913.
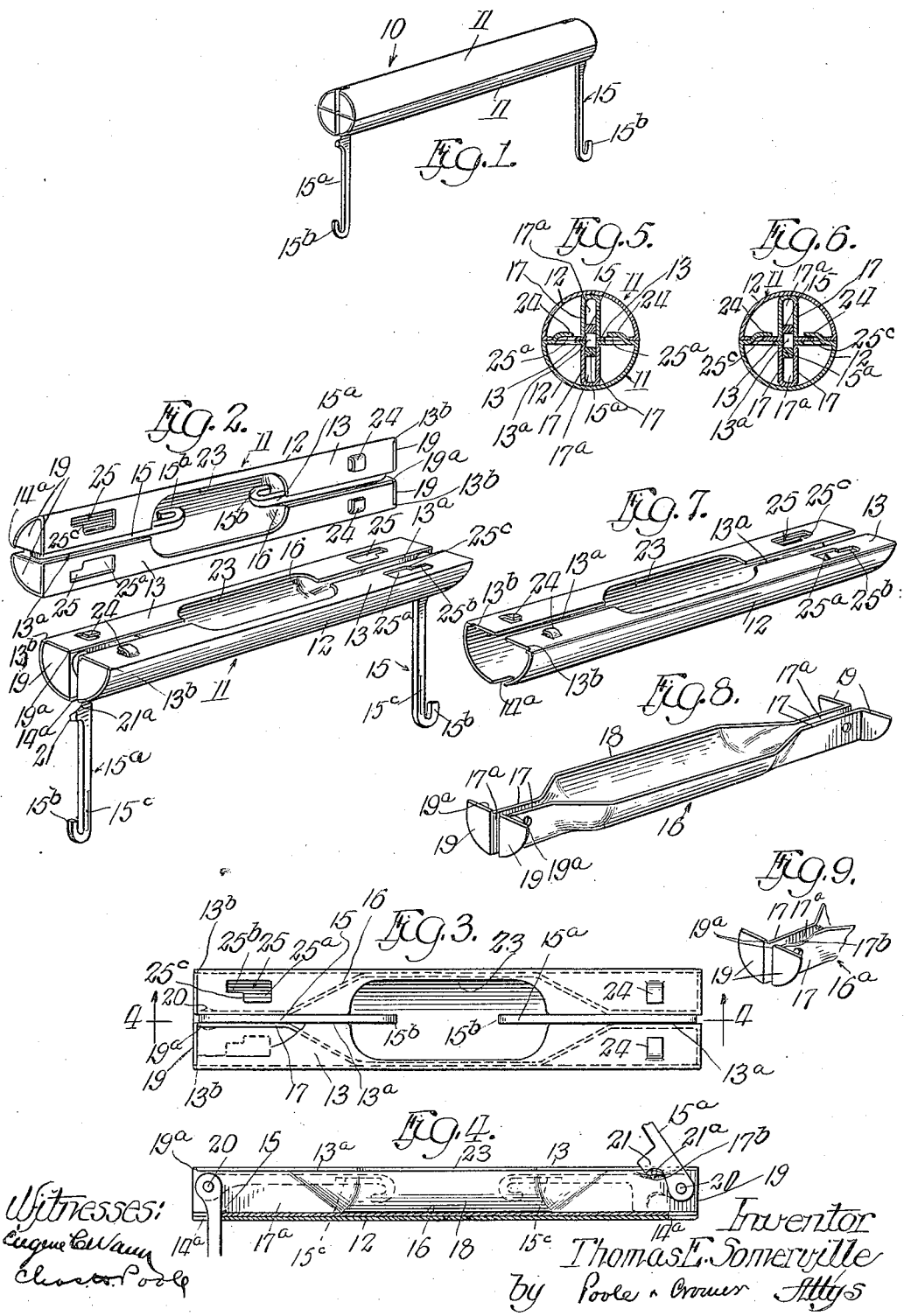

UNITED STATES PATENT OFFICE.

THOMAS E. SOMERVILLE, OF GLENELLYN, ILLINOIS.

BUNDLE-CARRIER.

1,081,559.

Specification of Letters Patent.  Patented Dec. 16, 1913.

Application filed March 10, 1913. Serial No. 753,191.

*To all whom it may concern:*

Be it known that I, THOMAS E. SOMERVILLE, a citizen of the United States, and a resident of Glenellyn, in the county of Dupage and State of Illinois, have invented certain new and useful Improvements in Bundle-Carriers; and I do hereby declare that the following is a full, clear, and exact description thereof, reference being had to the accompanying drawings, and to the letters of reference marked thereon, which form a part of this specification.

This invention relates to an improvement in package and bundle carriers of that kind embracing a handle provided with hooked arms for connecting the same with a bundle or article to be carried.

In the form of my improved bundle carrier, illustrated in the accompanying drawings, the same consists of an elongated rounded handle comprising two half-round, recessed members, each forming one-half of the longitudinally divided handle. Each of said handle members carries at its ends pivoted arms, each provided with a hook and adapted to be swung on its pivotal connection with said handle member either into a position where it is inclosed by said handle member or into a position projecting, at right angles thereto, from its rounded side. The two half-round handle members are adapted to be locked together with the carrying arms inclosed within the recesses of the respective handle members to which they are connected, in which case the carrier is in compact form for carrying in a pocket or otherwise. The device is so arranged that it may be used as a single carrier, when the arms of one handle member are swung into carrying position; or the two handle members may be separated, their respective arms swung into carrying position, and each used as a separate carrier.

The invention consists in the matters hereinafter described and pointed out in the appended claims.

In the drawings—Figure 1 is a perspective view of my improved carrier with the carrying arms of one handle member in position for engagement with the string on a bundle or package; Fig. 2 is a perspective view illustrating the two-part construction of my carrier, and showing the one handle member with its carrying arms in depending relation, and the other handle member with its carrying arms swung into closed position within said handle member; Fig. 3 is a top plan view of one of the handle members; Fig. 4 is a longitudinal, central section of the same, taken on the line 4—4 of Fig. 3; Figs. 5 and 6 are views representing cross sections through the two-part handle, showing the locking members which lock the parts of said handle together,—Fig. 5 showing the parts as they appear before said locking members are engaged; and Fig. 6 showing the parts as they appear after said locking members are engaged; Fig. 7 is a perspective view of the shell or body of one of the handle members; Fig. 8 is a perspective view of the bearing member in which the carrying arms are journaled; Fig. 9 is a perspective view of one end of a similar bearing member, which is in this case provided with a cutting blade.

Referring now in detail to that embodiment of my invention illustrated in the drawings, 10 indictaes the handle of the carrier which, in common with the other parts of the device, are preferably made of metal. Said handle comprises two elongated half-round sheet metal members 11, 11, each forming one-half of the body of the handle and which are identical in construction, so that a description of one will suffice for both.

As shown in the drawings, each handle member 11 is in the form of a half-round tube having a semi-cylindric wall 12, and an integral, flat top wall 13. The flat top wall 13 is provided with a slot 13$^a$ formed between the edges of the piece of sheet metal constituting the handle member and extending longitudinally of the handle member centrally of the said wall 13.

15, 15$^a$ indicate carrying arms provided with hooks 15$^b$ at their ends and pivotally connected to the ends of the handle member to swing in the plane of the slot 13$^a$. Each carrying arm 15, 15$^a$ is pivotally supported at the end of its associated handle member by means of a bearing member 16 which is inserted in the body or shell of said member. Said bearing member preferably consists of a single piece of sheet metal, bent to form at the ends of the same, two parallel, longitudinally extending walls 17, 17 (see Fig. 8) and a central part 18, which is semi-cylindric in form. Said walls 17, 17 are provided at their outer ends with laterally extending flanges or wings 19, 19, which have side and bottom edges curved to fit or bear against the inner surface of the semi-cylindric wall 12 of the handle member and top edges adapted to fit against the ends of the top wall 13 thereof. Said bearing member is placed within the handle member with its semi-cylindric wall 18 fitting against the inner concave surface of the said handle member and with its flanges or wings 19 bearing against the end margins of said handle member and forming partial end walls for the same. When thus placed in the handle member the spaces 17$^a$, separating the lateral walls 17 of the bearing member, are located in the plane of the slot 13$^a$ formed in the flat wall 13 of said handle member. The end of each arm 15, 15$^a$ is pivoted between the lateral walls 17, 17 upon a pivot pin 20, which is secured at its ends in the said lateral walls 17, 17. The arms 15, 15$^a$ may be swung on their pivot pins 20 about the associated end of the handle member and down through the slot 13$^a$ in the flat, sectional wall thereof, into a position within said handle member. The ends of the tubular wall 12 of the handle member are provided with notches 14$^a$ located in the same plane with the longitudinal slot 13$^a$ of the top wall and the spaces between the walls 17, 17. The inner ends of said notches act as stops to limit the swing of one arm toward the other arm so that the arms will stand at right angles to the handle member when said arms are unfolded.

The bearing member 16 is inserted endwise into the open-ended, tubular handle member 11, and when so inserted, its wings 19, 19 serve to close the open ends of, or to form end walls for, said handle member. As preferably constructed, the end margins of the flat top wall 13 are cut away at one end of the handle member 11, as shown at 13$^b$, while the wings 19, 19, at the corresponding end of the bearing member 16 are extended, as indicated at 19$^a$, 19$^a$, so as to overlap the said end margins; the contact of the said extended edges 19$^a$, 19$^a$ with the end margins of the walls 13, serving to hold the bearing member from further endwise movement when it is inserted in place within the handle member. The bearing member may be so closely fitted in the handle member that no special fastening means need be provided for holding the parts from relative movement, but if desired, the bearing member, may be permanently secured in place within the handle member by soldering or otherwise.

One end of the bearing member 16 is preferably provided with a cutting edge against which a string or cord is adapted to be cut by means of the carrying arm pivoted thereto, the arm and the said cutting edge together acting to sever the cord or string in the manner of a pair of scissors. 16$^a$ indicates a bearing member provided with such cutting edge. (See Fig. 9.) Said bearing member 16$^a$ is in every way like the bearing member above described, except that one of the walls 17 has a curved knife edge 17$^b$, which projects above the adjacent wall 17. The carrying arm 15$^a$ pivoted to said bearing member 16$^a$ is in this case provided near its pivotal connection to said member with a lug 21 having a curved knife edge 21$^a$ which is adapted to be caught under a string or cord which, upon swinging said arm into a position within its associated handle member, will be carried into a position across the knife edge 17$^b$ of the bearing member and will be cut by the action of said knife edges.

The handle members are provided with means for locking them together with all the carrying arms inclosed within the recesses of the respective handle members to which they are attached, or with the carrying arms of one member swung into position for use. Any convenient locking mechanism will suffice for the purpose. As shown in the drawings, said locking means is made as follows: At one of the handle members (see Fig. 2), the top wall 13 thereof is provided with oppositely disposed, laterally extending tongues 24, 24 formed by cutting the metal of said top wall and bending it outwardly away from and then parallel to said top wall. In the other handle member at the same end thereof, there are formed in the top wall section thereof, key-hole slots 25, 25, which each have a part 25$^a$ substantially as wide as the lateral extent of the tongue 24, and a narrower part 25$^b$ formed by an offset 25$^c$ on the inner edge of the slot 25. The opposite ends of the handle members are provided with like tongues and slots, except that the location of the tongues and slots is reversed, the handle member having the tongue at one end, having the slots at the other. To lock the handle members together, they are brought together with their top walls engaged against each other, and with the tongues 24 of each member inserted into the wider part 25$^a$ of the slots 25 of the other member. (See Fig. 5.) The one member is then moved longitudinally with respect to the other member, this movement causing the tongues 24 of the one member to engage under the offsets 25<sup>c</sup> of the other member, (see Fig. 6) and thus lock the two parts together. The slots and tongues are so arranged relative to the length of the handle members that when this movement has brought the tongues 24 into engagement with the offsets 25<sup>c</sup>, the ends of the two handle members will be in the same plane, the movement being limited by the striking of the tongues against the end walls of the associated slots. To provide room for inserting the finger to pull out the arms 15, 15<sup>a</sup> the top wall 13 of each handle member is cut away intermediate its ends to form an opening 23. The ends of the arms 15, 15<sup>a</sup> are preferably provided with notches 15<sup>c</sup> adapted for engagement by the finger nail.

The use of my improved carrier will be apparent from the above description. It is light and of such shape as to be easily carried in the pocket or other convenient receptacle and is always ready for use either as a single carrier or as two separate carriers.

The features of construction, by which the carrying arms are mounted on a single bearing member, adapted to be inserted endwise into the tubular body of the handle member, and by which said bearing member is provided with laterally extending integral wings which serve to form end walls for closing the ends of the said tubular body, afford important advantages in point of simplicity and cheapness of construction.

With respect to the feature of construction here referred to, my present invention constitutes an improvement upon the device shown in my prior Patent No. 1,020,722, issued March 19th, 1912.

While in describing one embodiment of my invention, I have referred to certain details of mechanical construction, it is apparent that these may be variously modified, and my invention is not limited thereby except as pointed out in the appended claims.

I claim as my invention:

1. A bundle carrier comprising a tubular handle member having a semi-cylindric wall and a flat top wall provided with a central longitudinal slot, a pair of carrying arms having hooked ends, pivoted to swing at the ends of said handle member in the plane of said slot, and a bearing member which is of semi-cylindric form at its central part and provided at its ends with parallel walls, forming longitudinally extending spaces located in the plane of said slot, said bearing member fitting within said handle member, and the carrying arms being pivoted between the said parallel walls of the bearing member at the ends of the same.

2. A bundle carrier comprising a tubular handle member open at its ends and having a semi-cylindric wall and a flat top wall provided with a central, longitudinal slot, a pair of carrying arms having hooked ends pivoted to swing at the ends of said handle member in the plane of said slot, and a bearing member which is of semi-cylindric form at its central part and has parallel walls at its ends forming longitudinal spaces located in the plane of said slot, said bearing member being fitted within said handle member, and having at the ends of its parallel walls laterally extending wings serving to close the ends of the tubular handle member, and the carrying arms being pivoted between the said parallel walls of the bearing member at the ends of the same.

3. A bundle carrier comprising a tubular handle member consisting of a piece of sheet metal bent to form a semi-cylindric wall and a flat top wall provided with a central longitudinal slot, a pair of carrying arms having hooked ends, pivoted to swing at the ends of said handle member in the plane of said slot, and a bearing member consisting of a piece of sheet metal bent into semi-cylindric form at its central part and into U-form at its ends to constitute parallel walls, said bearing member being inserted in said handle member, and the carrying arms being pivoted between the said parallel walls of the bearing member at the ends of the same.

4. A bundle carrier comprising a tubular handle member open at its ends and consisting of a piece of sheet metal bent to form a semi-cylindric wall and a flat top wall provided with a central, longitudinal slot, a pair of carrying arms having hooked ends pivoted to swing at the ends of said handle member in the plane of said slot, and a bearing member bent into semi-cylindric form at its central part and bent into U-form at its ends to form parallel walls, said bearing member being fitted within said handle member, and having, at the ends of said parallel walls, laterally bent wings serving to close the ends of the tubular handle member; the carrying arms being pivoted between the said parallel walls of the bearing member at the ends of the same.

5. A bundle carrier comprising two separable tubular handle members, each having a semi-cylindric wall and a flat top wall and provided with a longitudinal slot in said top wall, a pair of carrying arms having hooked ends for each handle member, pivoted to swing at the ends of each handle member in the plane of the slot thereof, bearing members, each having a semi-cylindric, central part and two parallel walls at its ends, said bearing member being inserted endwise into its corresponding handle member, with a space between said parallel walls in the plane of said longitudinal slot, and said carrying arms being inserted between and pivotally connected with said parallel walls of the bearing member, and means for removably locking said handle members together with the flat walls thereof in engagement with each other.

In testimony, that I claim the foregoing as my invention I affix my signature in the presence of two witnesses, this 5th day of March A. D. 1913.

THOMAS E. SOMERVILLE.

Witnesses:
 EUGENE C. WANN,
 M. F. ANTHONY.

Copies of this patent may be obtained for five cents each, by addressing the "Commissioner of Patents, Washington, D. C."